United States Patent
Wang (10) Patent No.: US 10,121,450 B2
(45) Date of Patent: Nov. 6, 2018

(54) EYE PROTECTING METHOD AND DEVICE OF SCREEN BASED ON VIRTUAL REALITY HELMET

(71) Applicant: HUIZHOU TCL MOBILE COMMUNICATION CO., LTD., Huizhou (CN)

(72) Inventor: Rui Wang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 15/503,714

(22) PCT Filed: Jul. 1, 2016

(86) PCT No.: PCT/CN2016/088141
§ 371 (c)(1),
(2) Date: Feb. 14, 2017

(87) PCT Pub. No.: WO2017/084349
PCT Pub. Date: May 26, 2017

(65) Prior Publication Data
US 2017/0278481 A1   Sep. 28, 2017

(30) Foreign Application Priority Data
Nov. 21, 2015  (CN) .......................... 2015 1 0817504

(51) Int. Cl.
*G06T 19/00* (2011.01)
*G09G 5/02* (2006.01)

(52) U.S. Cl.
CPC ............. *G09G 5/02* (2013.01); *G06T 19/006* (2013.01); *G09G 2320/0686* (2013.01); *G09G 2360/16* (2013.01)

(58) Field of Classification Search
None
See application file for complete search history.

(56) References Cited

U.S. PATENT DOCUMENTS

2015/0168723 A1* 6/2015 Eto ........................... H04N 9/73
348/51

FOREIGN PATENT DOCUMENTS

| CN | 101493532 A | 7/2009 |
| CN | 104091571 A | 10/2014 |

(Continued)

*Primary Examiner* — Nicholas R Wilson
(74) *Attorney, Agent, or Firm* — Shimokaji IP (57) ABSTRACT

The present invention discloses a method and an apparatus for eye protection based on a screen of a virtual reality headset, the method comprising: calculating, based on a plurality of weight areas divided on a screen of a virtual reality headset, a total cumulative amount of a blue component of pixels on the screen from a $t_0$ moment to a $t_1$ moment, wherein the plurality of weight areas is divided according to weights of impact of blue light on human eyes; determining, according to the total cumulative amount of the blue component from the $t_0$ moment to the $t_1$ moment, a blue light suppression factor at the $t_1$ moment, and then obtaining a suppressed blue component value of each pixel of an image at a next frame; outputting the image of the next frame with the suppressed blue component value. In such a way, the present invention can strike a balance between eye protection and guarantee of display performance.

20 Claims, 2 Drawing Sheets

(56) References Cited

FOREIGN PATENT DOCUMENTS

| | | |
|---|---|---|
| CN | 104335581 A | 2/2015 |
| CN | 104715701 A | 6/2015 |
| CN | 105489150 A | 4/2016 |
| WO | 2015097169 A1 | 7/2015 |

* cited by examiner

EYE PROTECTING METHOD AND DEVICE OF SCREEN BASED ON VIRTUAL REALITY HELMET

TECHNICAL FIELD

The present invention relates to the field of image display technologies, and in particular to a method and an apparatus for eye protection based on the screen of a virtual reality headset.

BACKGROUND

Headset display is the earliest virtual reality display, which makes a user to feel as if they are in a virtual environment by using the headset display to seal off human vision and hearing from the external world. The display principle is that screens for left and right eyes display images for left and right eyes, respectively, and a 3D image is generated in the brain after the human eyes obtain the different information. As a display device of virtual reality, the headset display has characteristics of small size and excellent closure, and has been extensively used in military training, virtual driving, virtual cities, and the like.

Since the screens are close to the eyes and the blue light component irritates eyes, a long time use of a virtual reality headset tends to result in visual fatigue. According to the prior art, the blue light component is suppressed in a simple and unified manner, for example, the B value in RGB of pixels is decreased according to a fixed ratio to lower the intensity of blue light. Although the above method can protect eyes, images are continuously yellowish, leading to a poor user experience.

SUMMARY

In an embodiment, a method for eye protection based on a screen of a virtual reality headset is provided, the method comprising: calculating, based on a plurality of weight areas divided on the screen of a virtual reality headset, the total cumulative amount of the blue component of pixels on the screen at a t moment, wherein the plurality of weight areas is divided according to the weights of impact of blue light on human eyes; calculating, according to the total cumulative amount of the blue component at a t moment, the total cumulative amount of the blue component of pixels on the screen from a $t_0$ moment to a $t_1$ moment; determining, according to the total cumulative amount of the blue component from a $t_0$ moment to a $t_1$ moment, a blue light suppression factor at a $t_1$ moment, wherein, $D(t_1)=(1-c*Sum\_B(t_1))$, $D(t_1)$ is a blue light suppression factor at a $t_1$ moment, $Sum\_B(t_1)$ is a total cumulative amount of the blue component from a $t_0$ moment to a $t_1$ moment, and c is a modulation coefficient; obtaining a suppressed blue component value of each pixel of the image at the next frame, wherein, $B_0(i, j)=B_t(i, j)*D(t_1)$, $B_0(i, j)$ is a suppressed blue component value of the next frame, and $B_t(i, j)$ is an original blue component value of the next frame; outputting the next frame image with the suppressed blue component value.

In a further embodiment, the total cumulative amount of the blue component at a t moment is a total normalized cumulative amount of the blue component at a t moment, and the total normalized cumulative amount of the blue component at a t moment is:

$$\text{Sum\_B'}(t) = \frac{1}{X*Y/2} \sum_{i=1}^{X} \sum_{j=1}^{Y/2} \frac{B_t(i, j) * T(i, j)}{N},$$

In a further embodiment, $\text{Sum\_B'}(t)$ is a total normalized cumulative amount of the blue component at a t moment, X*Y is a resolution of the screen, X*Y/2 is a resolution of each vision area of left and right eyes, $B_t(i, j)$ is a blue component value of a pixel (i, j) at a t moment, T(i, j) is a weight of the weight area in which the pixel (i, j) is, and N is a maximum value of the blue component value.

In a further embodiment, the total cumulative amount of the blue component from a $t_0$ moment to a $t_1$ moment is an average of total normalized cumulative amounts of the blue component in vision areas of left and right eyes from a $t_0$ moment to a $t_1$ moment, wherein, the total normalized cumulative amount of the blue component in vision areas of left and right eyes from a $t_0$ moment to a $t_1$ moment is:

$$\text{Sum\_B'}(t_1) = \frac{1}{(X*Y/2)*(t_1-t_0)*f} \sum_{t=t_0}^{t_1} \sum_{i=1}^{X} \sum_{j=1}^{Y/2} \frac{B_t(i, j) * T(i, j)}{N},$$

In a further embodiment, $\text{Sum\_B'}(t_1)$ is a total normalized cumulative amount of the blue component in vision areas of left and right eyes from a $t_0$ moment to a $t_1$ moment, and f is a frame rate.

In another embodiment, a method for eye protection based on the screen of a virtual reality headset is provided, the method comprising: calculating, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes; determining, according to the total cumulative amount of the blue component from a $t_0$ moment to a $t_1$ moment, a blue light suppression factor at a $t_1$ moment, and then obtaining a suppressed blue component value of each pixel of the image at the next frame; outputting the next frame image with the suppressed blue component value.

In a further embodiment, the step of calculating, based on a plurality of weight areas divided on the screen of a virtual reality headset, the total cumulative amount of the blue component of pixels on the screen from a $t_0$ moment to a $t_1$ moment comprises: calculating, based on a plurality of weight areas divided on the screen of a virtual reality headset, the total cumulative amount of the blue component of pixels on the screen at a t moment; calculating, according to the total cumulative amount of the blue component at a t moment, the total cumulative amount of the blue component of pixels on the screen from a $t_0$ moment to a $t_1$ moment.

In a further embodiment, the total cumulative amount of the blue component at a t moment is a total normalized cumulative amount of the blue component at a t moment, and the total normalized cumulative amount of the blue component at a t moment is:

$$\text{Sum\_B'}(t) = \frac{1}{X*Y/2} \sum_{i=1}^{X} \sum_{j=1}^{Y/2} \frac{B_t(i, j) * T(i, j)}{N},$$

Wherein, Sum_B'(t) is a total normalized cumulative amount of the blue component at a t moment, X*Y is a resolution of the screen, X*Y/2 is a resolution of each vision area of left and right eyes, $B_t(i, j)$ is a blue component value of a pixel (i, j) at a t moment, T(i, j) is a weight of the weight area in which the pixel (i, j) is, and N is a maximum value of the blue component value.

In a further embodiment, the total cumulative amount of the blue component from a $t_0$ moment to a $t_1$ moment is an average of total normalized cumulative amounts of the blue component in vision areas of left and right eyes from a $t_0$ moment to a $t_1$ moment, wherein, the total normalized cumulative amount of the blue component in vision areas of left and right eyes from a $t_0$ moment to a $t_1$ moment is:

$$\text{Sum\_B}'(t_1) = \frac{1}{(X*Y/2)*(t_1-t_0)*f} \sum_{t=t_0}^{t_1} \sum_{i=1}^{X} \sum_{j=1}^{Y/2} \frac{B_t(i,j)*T(i,j)}{N},$$

In a further embodiment, Sum_B'($t_1$) is a total normalized cumulative amount of the blue component in vision areas of left and right eyes from a $t_0$ moment to a $t_1$ moment, and f is a frame rate.

In a further embodiment, the step of determining, according to the total cumulative amount of the blue component from a $t_0$ moment to a $t_1$ moment, a blue light suppression factor at a $t_1$ moment, and then obtaining a suppressed blue component value of each pixel of the image at the next frame comprises: determining, according to the total cumulative amount of the blue component from a $t_0$ moment to a $t_1$ moment, a blue light suppression factor at a $t_1$ moment, wherein D($t_1$)=(1−c*Sum_B($t_1$)), D($t_1$) is a blue light suppression factor at a $t_1$ moment, Sum_B($t_1$) is a total cumulative amount of the blue component from a $t_0$ moment to a $t_1$ moment, and c is a modulation coefficient; obtaining a suppressed blue component value of each pixel of the image at the next frame, wherein, $B_0(i,j)=B_t(i,j)*D(t_1)$, $B_0(i,j)$ is a suppressed blue component value of the next frame, and $B_t(i,j)$ is an original blue component value of the next frame.

In another embodiment, an apparatus for eye protection based on the screen of a virtual reality headset is provided, the apparatus comprising: a calculating module configured to calculate, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes; a determining module configured to determine, according to the total cumulative amount of the blue component from a $t_0$ moment to a $t_1$ moment, a blue light suppression factor at a $t_1$ moment, and then obtain a suppressed blue component value of each pixel of the image at the next frame; an outputting module configured to output the next frame image with the suppressed blue component value.

In a further embodiment, the calculating module comprises: a first calculating unit configured to calculate, based on a plurality of weight areas divided on the screen of a virtual reality headset, the total cumulative amount of the blue component of pixels on the screen at a t moment; a second calculating unit configured to calculate, according to the total cumulative amount of the blue component at a t moment, the total cumulative amount of the blue component of pixels on the screen from a $t_0$ moment to a $t_1$ moment.

In a further embodiment, the total cumulative amount of the blue component at a t moment is a total normalized cumulative amount of the blue component at a t moment, and the total normalized cumulative amount of the blue component at a t moment is:

$$\text{Sum\_B}'(t) = \frac{1}{X*Y/2} \sum_{i=1}^{X} \sum_{j=1}^{Y/2} \frac{B_t(i,j)*T(i,j)}{N},$$

Wherein, Sum_B'(t) is a total normalized cumulative amount of the blue component at a t moment, X*Y is a resolution of the screen, X*Y/2 is a resolution of each vision area of left and right eyes, $B_t(i, j)$ is a blue component value of a pixel (i, j) at a t moment, T(i, j) is a weight of the weight area in which the pixel (i, j) is, and N is a maximum value of the blue component value.

In a further embodiment, the total cumulative amount of the blue component from a $t_0$ moment to a $t_1$ moment is an average of total normalized cumulative amounts of the blue component in vision areas of left and right eyes from a $t_0$ moment to a $t_1$ moment, wherein, the total normalized cumulative amount of the blue component in vision areas of left and right eyes from a $t_0$ moment to a $t_1$ moment is:

$$\text{Sum\_B}'(t_1) = \frac{1}{(X*Y/2)*(t_1-t_0)*f} \sum_{t=t_0}^{t_1} \sum_{i=1}^{X} \sum_{j=1}^{Y/2} \frac{B_t(i,j)*T(i,j)}{N},$$

Wherein, Sum_B'($t_1$) is a total normalized cumulative amount of the blue component in vision areas of left and right eyes from a $t_0$ moment to a $t_1$ moment, and f is a frame rate.

In a further embodiment, the determining module comprises: a determining unit configured to determine, according to the total cumulative amount of the blue component from a $t_0$ moment to a $t_1$ moment, a blue light suppression factor at a $t_1$ moment, wherein, D($t_1$)=(1−c*Sum_B($t_1$)), D($t_1$) is a blue light suppression factor at a $t_1$ moment, Sum_B($t_1$) is a total cumulative amount of the blue component from a $t_0$ moment to a $t_1$ moment, and c is a modulation coefficient; an obtaining unit configured to obtain a suppressed blue component value of each pixel of the image at the next frame, wherein, $B_0(i, j)=B_t(i,j)*D(t_1)$, $B_0(i, j)$ is a suppressed blue component value of the next frame, and $B_t(i, j)$ is an original blue component value of the next frame.

The present invention has the following advantageous effects: unlike the prior art, the present invention calculates, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes; determines, according to the total cumulative amount of the blue component from a $t_0$ moment to a $t_1$ moment, a blue light suppression factor at a $t_1$ moment, and then obtains a suppressed blue component value of each pixel of the image at the next frame; outputs the next frame image with the suppressed blue component value. Since the blue light suppression factor is determined according to the total cumulative amount of the blue component from a $t_0$ moment to a $t_1$ moment and the total cumulative amount of the blue component from a $t_0$ moment to a $t_1$ moment changes along with time, the blue light suppression factor changes along with time as well. In such a way, it can strike a balance between eye protection and guarantee of display performance.

DETAILED DESCRIPTION

The present invention will be further described in detail below with reference to the accompanying drawings and specific embodiments.

Figure 1:
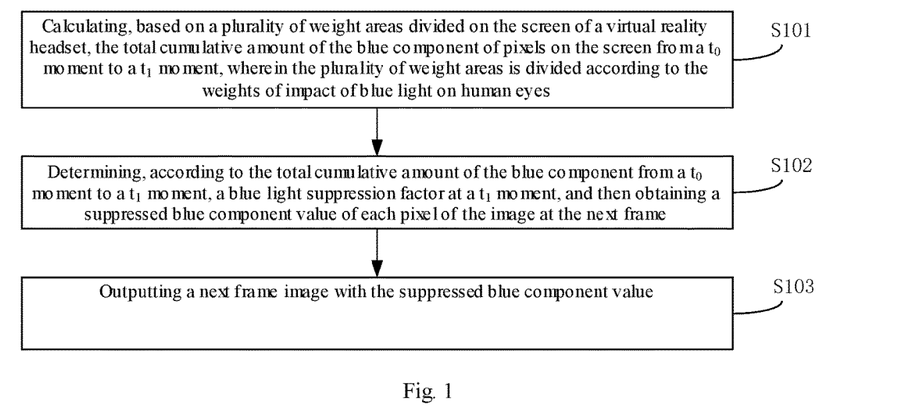
FIG. 1 depicts a flow chart of a method for eye protection based on the screen of a virtual reality headset according to an exemplary embodiment of the present invention.

Referring to FIG. 1, FIG. 1 is a flow chart of an embodiment of a method for eye protection based on the screen of a virtual reality headset according to the present invention, the method comprising:

calculating, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes. (Block S101)

Figure 2:
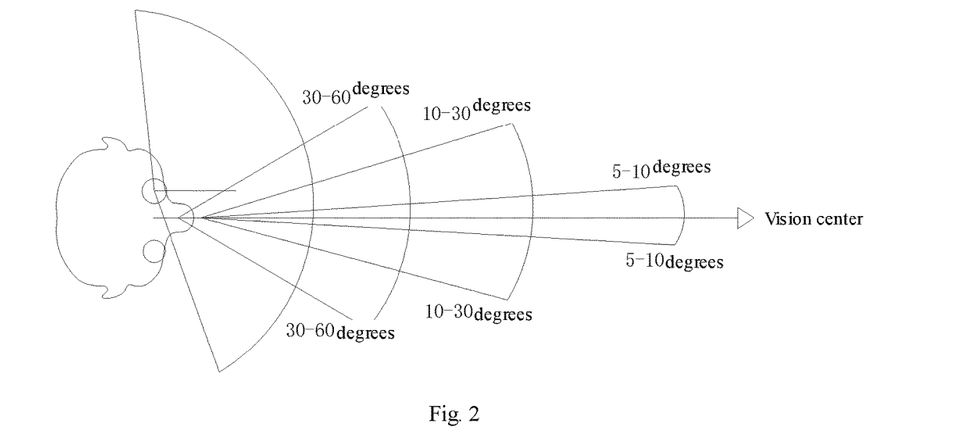
FIG. 2 depicts a schematic diagram of screen division using the method for eye protection based on the screen of a virtual reality headset according to an exemplary embodiment of the present invention.
Figure 3:
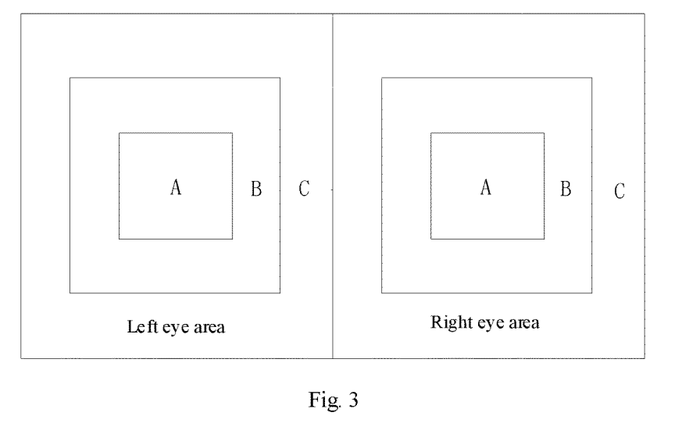
FIG. 3 depicts another schematic diagram of screen division using the method for eye protection based on the screen of a virtual reality headset according to an exemplary embodiment of the present invention.

Due to the characteristics of human eyes, humans have different perceptions in different ranges of horizontal viewing angle, and human perception becomes weaker as the angle increases. For image contents on a screen, the contents closer to the center have greater impact on human eyes. Therefore, as shown in FIG. 2 and FIG. 3, a screen may be divided into a number of weight areas, for example, Area A 5 to 10 degrees, Area B 10 to 30 degrees, and Area C 30 to 60 degrees. The blue light impact weight T increases for areas closer to the visual center. T(A)>T(B)>T(C). The specific design of weights is made by a terminal manufacturer according to the size and brightness of a screen. For example, when a screen is big, the difference between T(A), T(B) and T(C) may be relatively big, and when a screen is small, the difference between T(A), T(B) and T(C) may be relatively small; when the brightness is high, the difference between T(A), T(B) and T(C) may be relatively big, and when the brightness is low, the difference between T(A), T(B) and T(C) may be relatively small. When the content of the image is concentrated in the visual center, then the difference between T(A), T(B) and T(C) may be larger; when the content of the image is dispersed over the entire screen, then the difference between T(A), T(B) and T(C) may be smaller. Naturally, how to specifically divide the areas and to determine the range of each are in a practical application are dependent on specific situations, which are not defined herein.

For different weight areas, the weights of blue light impact on human eyes are different. First, determining in which area a pixel is located, then multiplying the blue component of the pixel at a moment and the weight of the weight area, which is the blue component contributed by the pixel at this moment, determining the sum of blue components contributed by all pixels of the image at this moment, which is the total cumulative amount of all pixels at this moment, determining the sum of the total pixels of all the pixels in the image from t0 to t1, which is the blue components of the pixels from a $t_0$ moment to a $t_1$ moment. Alternatively, first determining in which area a pixel is located, then multiplying the blue component of the pixel at a moment and the weight of the weight area, which is the blue component contributed by the pixel at this moment, determining the sum of blue components contributed by the pixel from a $t_0$ moment to a $t_1$ moment, which is the total cumulative amount of the blue component of the pixel from a $t_0$ moment to a $t_1$ moment, subsequently determining the sum of blue components of all pixels from a $t_0$ moment to a $t_1$ moment, which is the total cumulative amount of the blue components of the pixels from a $t_0$ moment to a $t_1$ moment.

Since the total cumulative amount of the blue components of the pixels from a $t_0$ moment to a $t_1$ moment is not just a cumulative amount of original blue components of all pixels, but a cumulative amount after multiplication with weights, the weight represents the impact of the blue light (blue component) of an area on human eyes, the blue component of pixels in an area with a higher weight makes greater contribution to the cumulative amount, and the blue component of pixels in an area with a lower weight makes smaller contribution to the cumulative amount determining, according to the total cumulative amount of the blue component from a $t_0$ moment to a $t_1$ moment, a blue light suppression factor at a $t_1$ moment, and then obtaining a suppressed blue component value of each pixel of the image at the next frame. (Block S102)

There may be many ways of determining, according to the total cumulative amount of the blue component from a $t_0$ moment to a $t_1$ moment, a blue light suppression factor at a $t_1$ moment, for example, according to existing experience, simulating a functional relation between a total cumulative amount of the blue component from a $t_0$ moment to a $t_1$ moment and a blue light suppression factor; alternatively, simulating, according to different total cumulative amounts of the blue component from a $t_0$ moment to a $t_1$ moment, different relations; alternatively, in a form of segmented function, using different blue light suppression factors for the total cumulative amount of the blue component from a $t_0$ moment to a $t_1$ moment in different ranges.

When a blue light suppression factor is determined, a suppressed blue component value may be obtained by multiplying the original blue component value of each pixel of the image at the next frame and the blue light suppression factor; alternatively, first determining a functional relation between a suppressed blue component value of a pixel at the next frame and the original blue component value, the blue light suppression factor, and then obtaining, according to the functional relation, a suppressed blue component value of each pixel of the image at the next frame.

outputting a next frame image with the suppressed blue component value. (Block S103)

Since the blue light suppression factor is determined according to the total cumulative amount of the blue component from a $t_0$ moment to a $t_1$ moment and the total cumulative amount of the blue component from a $t_0$ moment to a $t_1$ moment changes along with time, the blue light suppression factor changes along with time as well. As a result, the next frame image with the suppressed blue component value is also subject to dynamic adjustment and is not invariant.

The core concept of embodiments of the present invention is that the cumulation of display blue component along with the time of continuous use by a user is monitored through area division and weighting, and the higher the cumulative amount within a unit time, the greater a blue light suppression factor becomes. In such a way, it can ensure that, when a content in blue color is used lightly for a short period, the blue light suppression is weak and the original effect is ensured; when a content in blue color is used heavily for a long period, the blue light suppression is enhanced, the image is a little bit warm-toned, but the protection for eyes is strengthened, thereby striking a balance between eye protection and guarantee of display performance.

An embodiment of the present invention calculates, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes; determines, according to the total cumulative amount of the blue component from a $t_0$ moment to a $t_1$ moment, a blue light suppression factor at a $t_1$ moment, and then obtains a suppressed blue component value of each pixel of the image at the next frame; outputs the next frame image with the suppressed blue component value. Since the blue light suppression factor is determined according to the total cumulative amount of the blue component from a $t_0$ moment to a $t_1$ moment and the total cumulative amount of the blue component from a $t_0$ moment to a $t_1$ moment changes along with time, the blue light suppression factor changes along with time as well. As a result, the next frame image with the suppressed blue component value is also subject to dynamic adjustment and is not invariant. In such a way, it can strike a balance between eye protection and guarantee of display performance.

Figure 4:
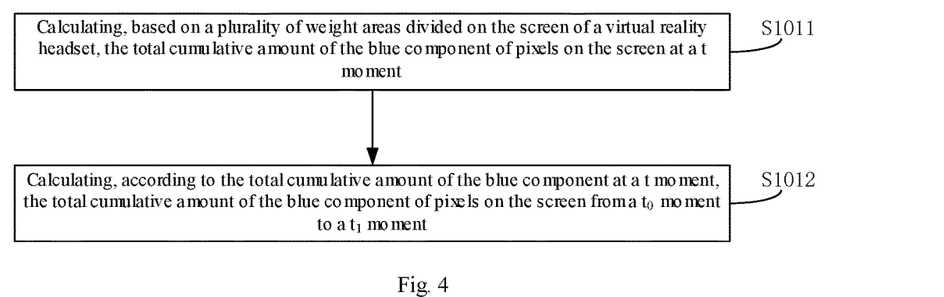
FIG. 4 depicts a flow chart of the method for eye protection based on the screen of a virtual reality headset according to another exemplary embodiment of the present invention.

Wherein, referring to FIG. 4, Block S101 may comprise: Block S1011 and Block S1012.

calculating, based on a plurality of weight areas divided on the screen of a virtual reality headset, the total cumulative amount of the blue component of pixels on the screen at a t moment. (Block S1011)

calculating, according to the total cumulative amount of the blue component at a t moment, the total cumulative amount of the blue component of pixels on the screen from a $t_0$ moment to a $t_1$ moment. (Block S1012)

Since the weight areas are divided according to the weights of impact of blue light on human eyes, pixels in different areas have different impacts on the total cumulative amount, and during adjustment, the impact of each area is different, thereby scientifically balancing user experience and the issue of eye fatigue.

Wherein, the total cumulative amount of the blue component at a t moment is a total normalized cumulative amount of the blue component at a t moment, and the total normalized cumulative amount of the blue component at a t moment is:

$$\text{Sum\_B}'(t) = \frac{1}{X*Y/2} \sum_{i=1}^{X} \sum_{j=1}^{Y/2} \frac{B_t(i,j)*T(i,j)}{N} \quad (1)$$

In the equation above, Sum_B'(t) is a total normalized cumulative amount of the blue component at a t moment, X*Y is a resolution of the screen, X*Y/2 is a resolution of each vision area of left and right eyes, $B_t(i, j)$ is a blue component value of a pixel (i, j) at a t moment, T(i, j) is a weight of the weight area in which the pixel (i, j) is, and N is a maximum value of the blue component value.

Normalization is a non-dimensional processing means, which changes absolute values of physical system values to a relation of relative values. In such a way, computation can be simplified and magnitude reduced.

Wherein, the total cumulative amount of the blue component from a $t_0$ moment to a $t_1$ moment is an average of total normalized cumulative amounts of the blue component in vision areas of left and right eyes from a $t_0$ moment to a $t_1$ moment, wherein, the total normalized cumulative amount of the blue component in vision areas of left and right eyes from a $t_0$ moment to a $t_1$ moment is:

$$\text{Sum\_B}'(t_1) = \frac{1}{(X*Y/2)*(t_1-t_0)*f} \sum_{t=t_0}^{t_1} \sum_{i=1}^{X} \sum_{j=1}^{Y/2} \frac{B_t(i,j)*T(i,j)}{N} \quad (2)$$

In the equation above, Sum_'($t_1$) is a total normalized cumulative amount of the blue component in vision areas of left and right eyes from a $t_0$ moment to a $t_1$ moment, and f is a frame rate, with a unit of frame per second, that indicates the rate at which the screen is refreshed.

Figure 5:
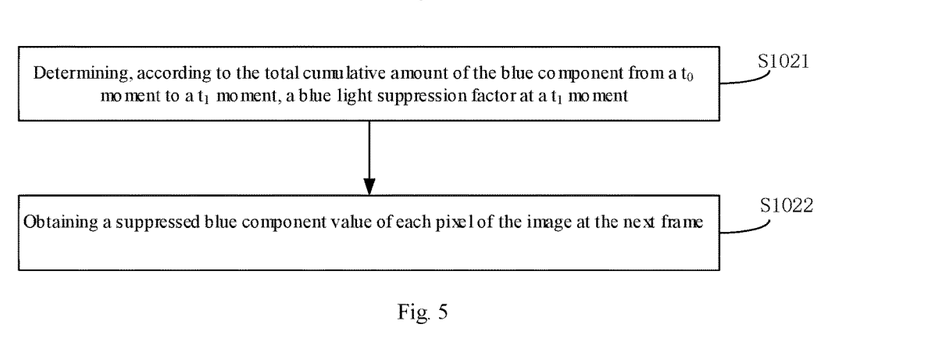
FIG. 5 depicts a flow chart of the method for eye protection based on the screen of a virtual reality headset according to yet another exemplary embodiment of the present invention.

Wherein, referring to FIG. 5, Block S102 may comprise: a Block S1021 and a Block S1022.

determining, according to the total cumulative amount of the blue component from a $t_0$ moment to a $t_1$ moment, a blue light suppression factor at a $t_1$ moment, wherein, $D(t_1)=(1-c*\text{Sum\_B}(t_1))$, $D(t_1)$ is a blue light suppression factor at a $t_1$ moment, Sum_B($t_1$) is a total cumulative amount of the blue component from a $t_0$ moment to a $t_1$ moment, and c is a modulation coefficient. (Block S1021)

With respect to the modulation coefficient c, various terminal manufacturers may design the parameter according to specific features of screens and different users.

For example, when Sum_B'($t_1$) is obtained according to the equation (2) for left and right eyes, respectively, an average of total normalized cumulative amounts of the blue component in vision areas of left and right eyes from a $t_0$ moment to a $t_1$ moment is obtained, which is the total cumulative amount, Sum_B($t_1$), of the blue component from a $t_0$ moment to a $t_1$ moment, and then D($t_1$) can be obtained according to $D(t_1)=(1-c*\text{Sum\_B}(t_1))$.

obtaining a suppressed blue component value of each pixel of the image at the next frame, wherein, $B_0(i, j)=B_t(i, j)*D(t_1)$, $B_0(i, j)$ is a suppressed blue component value of the next frame, and $B_t(i, j)$ is an original blue component value of the next frame. (Block S1022)

Figure 6:
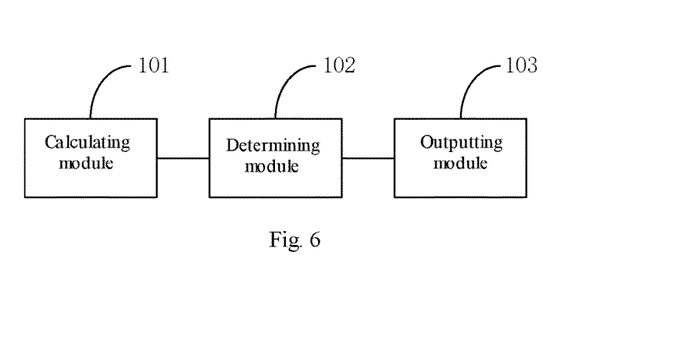
FIG. 6 depicts a structural schematic diagram of an apparatus for eye protection based on the screen of a virtual reality headset according to an exemplary embodiment of the present invention.

Referring to FIG. 6, FIG. 6 is a structural schematic diagram of an embodiment of an apparatus for eye protection based on the screen of a virtual reality headset according to the present invention, and the apparatus is capable of carrying out the steps of the above method. Please see the above method portion for detailed description of the relevant content, which will not be repeated herein.

The apparatus comprising: a calculating module 101, a determining module 102 and an outputting module 103.

The calculating module 101 is configured to calculate, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes.

The determining module 102 is configured to determine, according to the total cumulative amount of the blue component from a $t_0$ moment to a $t_1$ moment, a blue light suppression factor at a $t_1$ moment, and then obtain a suppressed blue component value of each pixel of the image at the next frame.

The outputting module 103 is configured to output the next frame image with the suppressed blue component value.

An embodiment of the present invention calculates, based on a plurality of weight areas divided on the screen of a virtual reality headset, the total cumulative amount of the blue component of pixels on the screen from a $t_0$ moment to a $t_1$ moment, wherein the plurality of weight areas is divided according to the weights of impact of blue light on human eyes; determines, according to the total cumulative amount of the blue component from a $t_0$ moment to a $t_1$ moment, a blue light suppression factor at a $t_1$ moment, and then obtains a suppressed blue component value of each pixel of the image at the next frame; outputs the next frame image with the suppressed blue component value. Since the blue light suppression factor is determined according to the total cumulative amount of the blue component from a $t_0$ moment to a $t_1$ moment and the total cumulative amount of the blue component from a $t_0$ moment to a $t_1$ moment changes along with time, the blue light suppression factor changes along with time as well. As a result, the next frame image with the suppressed blue component value is also subject to dynamic adjustment and is not invariant. In such a way, it can strike a balance between eye protection and guarantee of display performance.

Wherein, the calculating module 101 comprises: a first calculating unit and a second calculating unit.

The first calculating unit is configured to calculate, based on a plurality of weight areas divided on the screen of a virtual reality headset, the total cumulative amount of the blue component of pixels on the screen at a t moment.

The second calculating unit configured to calculate, according to the total cumulative amount of the blue component at a t moment, the total cumulative amount of the blue component of pixels on the screen from a $t_0$ moment to a $t_1$ moment.

Wherein, the total cumulative amount of the blue component at a t moment is a total normalized cumulative amount of the blue component at a t moment, and the total normalized cumulative amount of the blue component at a t moment is:

$$\text{Sum\_B}'(t) = \frac{1}{X*Y/2} \sum_{i=1}^{X} \sum_{j=1}^{Y/2} \frac{B_t(i,j)*T(i,j)}{N},$$

In the equation above, Sum_B'(t) is a total normalized cumulative amount of the blue component at a t moment, X*Y is a resolution of the screen, X*Y/2 is a resolution of each vision area of left and right eyes, $B_t(i, j)$ is a blue component value of a pixel (i, j) at a t moment, T(i, j) is a weight of the weight area in which the pixel (i, j) is, and N is a maximum value of the blue component value.

Wherein, the total cumulative amount of the blue component from a $t_0$ moment to a $t_1$ moment is an average of total normalized cumulative amounts of the blue component in vision areas of left and right eyes from a $t_0$ moment to a $t_1$ moment, wherein, the total normalized cumulative amount of the blue component in vision areas of left and right eyes from a $t_0$ moment to a $t_1$ moment is:

$$\text{Sum\_B}'(t_1) = \frac{1}{(X*Y/2)*(t_1-t_0)*f} \sum_{t=t_0}^{t_1} \sum_{i=1}^{X} \sum_{j=1}^{Y/2} \frac{B_t(i,j)*T(i,j)}{N},$$

In the equation above, Sum_B ($t_1$) to is a total normalized cumulative amount of the blue component in vision areas of left and right eyes from a $t_0$ moment to a $t_1$ moment, and f is a frame rate.

Wherein, the determining module 102 comprises: a determining unit and an obtaining unit.

The determining unit is configured to determine, according to the total cumulative amount of the blue component from a $t_0$ moment to a $t_1$ moment, a blue light suppression factor at a $t_1$ moment, wherein, $D(t_1)=(1-c*\text{Sum\_B}(t_1))$, $D(t_1)$ is a blue light suppression factor at a $t_1$ moment, Sum_B($t_1$) is a total cumulative amount of the blue component from a $t_0$ moment to a $t_1$ moment, and c is a modulation coefficient.

The obtaining unit is configured to obtain a suppressed blue component value of each pixel of the image at the next frame, wherein, $B_O(i,j)=B_t(i,j)*D(t_1)$, $B_O(i,j)$ is a suppressed blue component value of the next frame, and $B_t(i,j)$ is an original blue component value of the next frame.

Only ways to implement the present invention are described above, which is not to limit the scope of the present invention. Any equivalent structure or equivalent flow change, or direct or indirect application in other related technical fields, achieved by using the Specification and Drawings of the present invention shall be encompassed in the scope of the present invention.

The invention claimed is:

1. A method for eye protection based on a screen of a virtual reality headset, wherein the method comprises:
   calculating, based on a plurality of weight areas divided on the screen of the virtual reality headset, a total cumulative amount of a blue component of pixels on the screen at a t moment, wherein the plurality of weight areas is divided according to weights of impact of blue light on human eyes;
   calculating, according to the total cumulative amount of the blue component at the t moment, a total cumulative amount of a blue component of pixels on the screen from a $t_0$ moment to a $t_1$ moment;
   determining, according to the total cumulative amount of the blue component from the $t_0$ moment to the $t_1$ moment, a blue light suppression factor at the $t_1$ moment, wherein, $D(t_1)=(1-c*\text{Sum\_B}(t_1))$, $D(t_1)$ is the blue light suppression factor at the $t_1$ moment, Sum_B ($t_1$) is a total cumulative amount of the blue component from the $t_0$ moment to the $t_1$ moment, and c is a modulation coefficient;
   obtaining a suppressed blue component value of each pixel of the image at a next frame, wherein, $B_O(i,j)=B_t(i,j)*D(t_1)$, $B_O(i,j)$ is the suppressed blue component value of the next frame, and $B_t(i, j)$ is an original blue component value of the next frame;

outputting the image of the next frame with the suppressed blue component value.

2. The method according to claim 1, wherein the total cumulative amount of the blue component at the t moment is a total normalized cumulative amount of the blue component at the t moment, and the total normalized cumulative amount of the blue component at the t moment is:

$$\text{Sum\_B}'(t) = \frac{1}{X*Y/2} \sum_{i=1}^{X} \sum_{j=1}^{Y/2} \frac{B_t(i, j) * T(i, j)}{N},$$

Wherein, Sum_B'(t) is the total normalized cumulative amount of the blue component at the t moment, X*Y is a resolution of the screen, X*Y/2 is a resolution of each vision area of left and right eyes, $B_t(i, j)$ is a blue component value of a pixel (i, j) at the t moment, T(i, j) is a weight of a weight area of the plurality of weight areas in which the pixel (i, j) is located, and N is a maximum value of the blue component value.

3. The method according to claim 2, wherein the total cumulative amount of the blue component from the $t_0$ moment to the $t_1$ moment is an average of total normalized cumulative amounts of the blue component in vision areas of left and right eyes from the $t_0$ moment to the $t_1$ moment, wherein, the total normalized cumulative amount of the blue component in vision areas of left and right eyes from the $t_0$ moment to the $t_1$ moment is:

$$\text{Sum\_B}'(t_1) = \frac{1}{(X*Y/2)*(t_1 - t_0)*f} \sum_{t=t_0}^{t_1} \sum_{i=1}^{X} \sum_{j=1}^{Y/2} \frac{B_t(i, j) * T(i, j)}{N},$$

Wherein, Sum_B'($t_1$) is the total normalized cumulative amount of the blue component in vision areas of left and right eyes from the $t_0$ moment to the $t_1$ moment, and f is a frame rate.

4. The method of claim 1, wherein the plurality of weight areas divide the screen according to horizontal viewing angle ranges.

5. The method of claim 4, wherein the viewing angle ranges include 5 to 10 degrees, 10 to 30 degrees, and 30 to 60 degrees.

6. The method of claim 1, wherein the modulation coefficient is based on a specific feature of the screen.

7. A method for eye protection based on a screen of a virtual reality headset, wherein the method comprises:

calculating, based on a plurality of weight areas divided on the screen of the virtual reality headset, a total cumulative amount of a blue component of pixels on the screen from a $t_0$ moment to a $t_1$ moment, wherein the plurality of weight areas is divided according to weights of impact of blue light on human eyes;

determining, according to the total cumulative amount of the blue component from the $t_0$ moment to the $t_1$ moment, a blue light suppression factor at the $t_1$ moment, and then obtaining a suppressed blue component value of each pixel of an image at a next frame;

outputting the image of the next frame with the suppressed blue component value.

8. The method according to claim 7, wherein the calculating comprises:

calculating, based on the plurality of weight areas divided on the screen of the virtual reality headset, a total cumulative amount of a blue component of pixels on the screen at a t moment;

calculating, according to the total cumulative amount of the blue component at the t moment, the total cumulative amount of the blue component of pixels on the screen from the $t_0$ moment to the $t_1$ moment.

9. The method according to claim 8, wherein the total cumulative amount of the blue component at the t moment is a total normalized cumulative amount of the blue component at the t moment, and the total normalized cumulative amount of the blue component at the t moment is:

$$\text{Sum\_B}'(t) = \frac{1}{X*Y/2} \sum_{i=1}^{X} \sum_{j=1}^{Y/2} \frac{B_t(i, j) * T(i, j)}{N},$$

Wherein, Sum_B'(t) is the total normalized cumulative amount of the blue component at the t moment, X*Y is a resolution of the screen, X*Y/2 is a resolution of each vision area of left and right eyes, $B_t(i, j)$ is a blue component value of a pixel (i, j) at the t moment, T(i, j) is a weight of a weight area of the plurality of weight areas in which the pixel (i, j) is located, and N is a maximum value of the blue component value.

10. The method according to claim 9, wherein the total cumulative amount of the blue component from the $t_0$ moment to the $t_1$ moment is an average of total normalized cumulative amounts of the blue component in vision areas of left and right eyes from the $t_0$ moment to the $t_1$ moment, wherein, the total normalized cumulative amount of the blue component in vision areas of left and right eyes from the $t_0$ moment to the $t_1$ moment is:

$$\text{Sum\_B}'(t_1) = \frac{1}{(X*Y/2)*(t_1 - t_0)*f} \sum_{t=t_0}^{t_1} \sum_{i=1}^{X} \sum_{j=1}^{Y/2} \frac{B_t(i, j) * T(i, j)}{N},$$

Wherein, Sum_B'($t_1$) is the total normalized cumulative amount of the blue component in vision areas of left and right eyes from the $t_0$ moment to the $t_1$ moment, and f is a frame rate.

11. The method according to claim 7, wherein the determining comprises:

determining, according to the total cumulative amount of the blue component from the $t_0$ moment to the $t_1$ moment, the blue light suppression factor at the $t_1$ moment, wherein D($t_1$)=(1−c*Sum_B($t_1$)), D($t_1$) is the blue light suppression factor at the $t_1$ moment, Sum_B ($t_1$) is the total cumulative amount of the blue component from the $t_0$ moment to the $t_1$ moment, and c is a modulation coefficient;

obtaining the suppressed blue component value of each pixel of the image at the next frame, wherein, $B_0(i, j)=B_t(i, j)*D(t_1)$, $B_0(i, j)$ is the suppressed blue component value of the next frame, and $B_t(i, j)$ is an original blue component value of the next frame.

12. The method of claim 7, wherein the plurality of weight areas divide the screen according to horizontal viewing angle ranges.

13. The method of claim 12, wherein the viewing angle ranges include 5 to 10 degrees, 10 to 30 degrees, and 30 to 60 degrees.

14. An apparatus for eye protection based on a screen of a virtual reality headset, wherein the apparatus comprises one or more modules configured to:

calculate, based on a plurality of weight areas divided on the screen of the virtual reality headset, a total cumulative amount of a blue component of pixels on the screen from a $t_0$ moment to a $t_1$ moment, wherein the plurality of weight areas is divided according to weights of impact of blue light on human eyes;

determine, according to the total cumulative amount of the blue component from the $t_0$ moment to the $t_1$ moment, a blue light suppression factor at the $t_1$ moment, and then obtain a suppressed blue component value of each pixel of an image at a next frame;

output the image of the next frame imago with the suppressed blue component value.

15. The apparatus according to claim 14, wherein the calculating comprises:

calculate, based on the plurality of weight areas divided on the screen of a virtual reality headset, the total cumulative amount of the blue component of pixels on the screen at a t moment;

calculate, according to a total cumulative amount of a blue component at the t moment, the total cumulative amount of the blue component of pixels on the screen from the $t_0$ moment to the $t_1$ moment.

16. The apparatus according to claim 15, wherein the total cumulative amount of the blue component at the t moment is a total normalized cumulative amount of the blue component at the t moment, and the total normalized cumulative amount of the blue component at the t moment is:

$$\mathrm{Sum\_B'}(t) = \frac{1}{X*Y/2} \sum_{i=1}^{X} \sum_{j=1}^{Y/2} \frac{B_t(i,j)*T(i,j)}{N},$$

Wherein, Sum_B'(t) is the total normalized cumulative amount of the blue component at the t moment, X*Y is a resolution of the screen, X*Y/2 is a resolution of each vision area of left and right eyes, $B_t(i, j)$ is a blue component value of a pixel (i, j) at the t moment, T (i, j) is a weight of a weight area in which the pixel (i, j) is located, and N is a maximum value of the blue component value.

17. The apparatus according to claim 16, wherein the total cumulative amount of the blue component from the $t_0$ moment to the $t_1$ moment is an average of total normalized cumulative amounts of the blue component in vision areas of left and right eyes from the $t_0$ moment to the $t_1$ moment, wherein, the total normalized cumulative amount of the blue component in vision areas of left and right eyes from the $t_0$ moment to the $t_1$ moment is:

$$\mathrm{Sum\_B'}(t_1) = \frac{1}{(X*Y/2)*(t_1-t_0)*f} \sum_{t=t_0}^{t_1} \sum_{i=1}^{X} \sum_{j=1}^{Y/2} \frac{B_t(i,j)*T(i,j)}{N},$$

Wherein, Sum_B'($t_1$) is the total normalized cumulative amount of the blue component in vision areas of left and right eyes from the $t_0$ moment to the $t_1$ moment, and f is a frame rate.

18. The apparatus according to claim 14, wherein the determining comprises:

determine, according to the total cumulative amount of the blue component from the $t_0$ moment to the $t_1$ moment, the blue light suppression factor at the $t_1$ moment, wherein, $D(t_1)=(1-c*\mathrm{Sum\_B}(t_1))$, $D(t_1)$ is the blue light suppression factor at the $t_1$ moment, Sum_B($t_1$) is the total cumulative amount of the blue component from the $t_0$ moment to the $t_1$ moment, and c is a modulation coefficient;

obtain the suppressed blue component value of each pixel of the image at the next frame, wherein, $B_0(i, j)=B_i(i, j)*D(t_1)$, $B_0(i, j)$ is the suppressed blue component value of the next frame, and $B_i(i, j)$ is an original blue component value of the next frame.

19. The apparatus of claim 14, wherein the plurality of weight areas divide the screen according to horizontal viewing angle ranges.

20. The apparatus of claim 19, wherein the viewing angle ranges include 5 to 10 degrees, 10 to 30 degrees, and 30 to 60 degrees.

* * * * *